(12) United States Patent
Lee

(10) Patent No.: US 10,884,106 B2
(45) Date of Patent: Jan. 5, 2021

(54) LIGHT DETECTION AND RANGING APPARATUS

(71) Applicant: LG INNOTEK CO., LTD., Seoul (KR)

(72) Inventor: Chang Hyuck Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 396 days.

(21) Appl. No.: 15/748,419

(22) PCT Filed: Jul. 29, 2016

(86) PCT No.: PCT/KR2016/008326
§ 371 (c)(1),
(2) Date: Jan. 29, 2018

(87) PCT Pub. No.: WO2017/018843
PCT Pub. Date: Feb. 2, 2017

(65) Prior Publication Data
US 2018/0217239 A1  Aug. 2, 2018

(30) Foreign Application Priority Data
Jul. 30, 2015  (KR) .................. 10-2015-0107742

(51) Int. Cl.
*G01C 3/08* (2006.01)
*G01S 7/481* (2006.01)
(Continued)

(52) U.S. Cl.
CPC .......... *G01S 7/4817* (2013.01); *G01S 7/4814* (2013.01); *G01S 7/4816* (2013.01); *G01S 7/4868* (2013.01);
(Continued)

(58) Field of Classification Search
CPC ...... G01S 7/497; G01S 7/4814; G01S 7/4816; G01S 7/4876; G01S 7/499; G01S 7/4868;
(Continued)

(56) References Cited

U.S. PATENT DOCUMENTS 8,120,754 B2  2/2012  Kaehler
8,390,791 B2  3/2013  Vert et al.
(Continued)

FOREIGN PATENT DOCUMENTS

KR  10-2009-0058866 A  6/2009
KR     10-1424665 B1  8/2014
KR  10-2014-0115852 A  10/2014

*Primary Examiner* — Mark Hellner
(74) *Attorney, Agent, or Firm* — Birch, Stewart, Kolasch & Birch, LLP

(57) ABSTRACT

A light detection and ranging apparatus according to one embodiment includes a light transmitting unit for emitting a plurality of beams in different directions from each other and a light receiving unit for allowing backward-propagating lights returning after the emitted beams hit an object and are reflected from the object, to be incident at angles different from each other, and measuring information on the object by using the plurality of incident backward-propagating light, wherein the light transmitting unit includes at least one light source for emitting light; a beam splitter for splitting the light emitted from the at least one light source into a first beam and a second beam; and a beam steering unit for dividing the second beam split by the beam splitter into a plurality of third beams and for emitting the divided third beams in directions different from each other, wherein the plurality of beams emitted from the light transmitting unit include the first beam and the plurality of third beams.

24 Claims, 6 Drawing Sheets

(51) Int. Cl.
  *G01S 7/497* (2006.01)
  *G01S 17/42* (2006.01)
  *G01S 7/499* (2006.01)
  *G01S 7/486* (2020.01)
  *G01S 7/487* (2006.01)
  *G02B 26/10* (2006.01)
  *G02B 27/00* (2006.01)
  *G02B 27/10* (2006.01)
  *G01S 7/4863* (2020.01)

(52) U.S. Cl.
  CPC ............ *G01S 7/4876* (2013.01); *G01S 7/497* (2013.01); *G01S 7/499* (2013.01); *G01S 17/42* (2013.01); *G02B 26/101* (2013.01); *G02B 27/0087* (2013.01); *G02B 27/106* (2013.01); *G01S 7/4863* (2013.01)

(58) Field of Classification Search
  CPC ... G01S 7/4863; G01S 17/42; G02B 27/0087; G02B 27/106
  USPC ........................................................ 356/5.01
  See application file for complete search history.

(56) References Cited

U.S. PATENT DOCUMENTS

| | | | |
|---|---|---|---|
| 2003/0043058 A1* | 3/2003 | Jamieson | G01C 23/005 340/961 |
| 2007/0229796 A1 | 10/2007 | Lee et al. | |
| 2009/0147239 A1 | 6/2009 | Zhu et al. | |
| 2015/0055115 A1* | 2/2015 | Pedersen | G01S 17/95 356/4.01 |
| 2015/0131080 A1* | 5/2015 | Retterath | G01S 17/10 356/5.01 |

* cited by examiner

[FIG. 1]
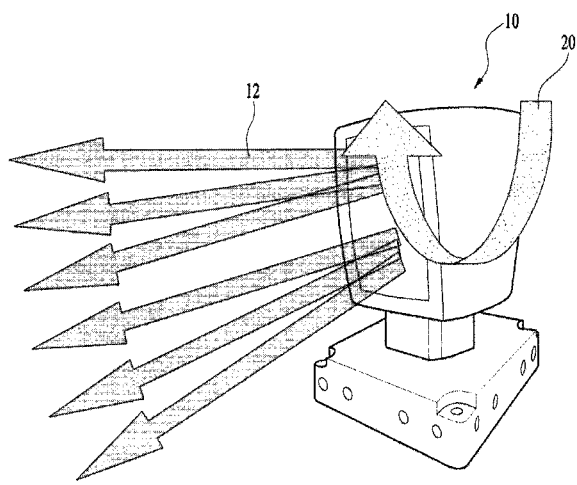

[FIG. 2]
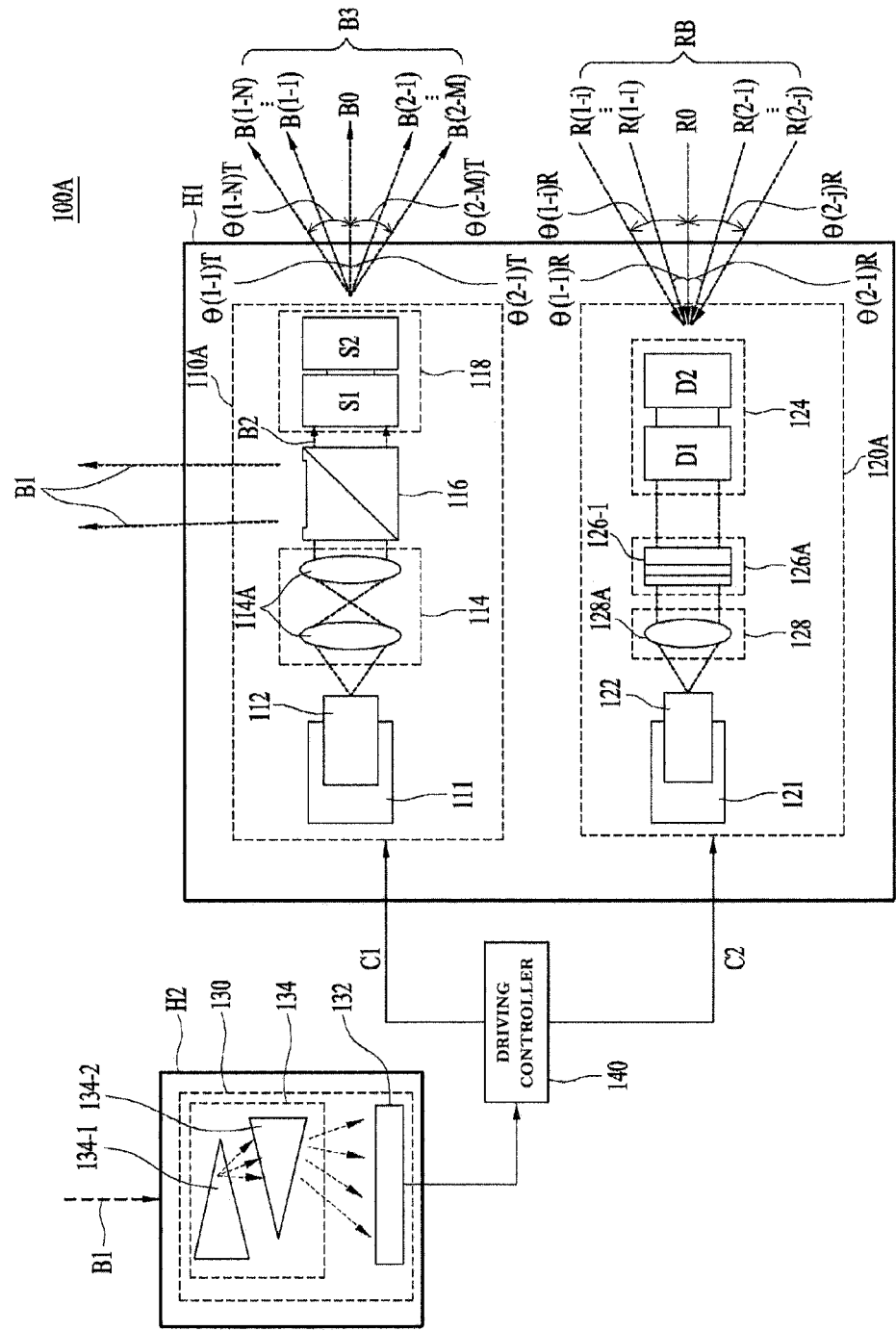

[FIG. 3]
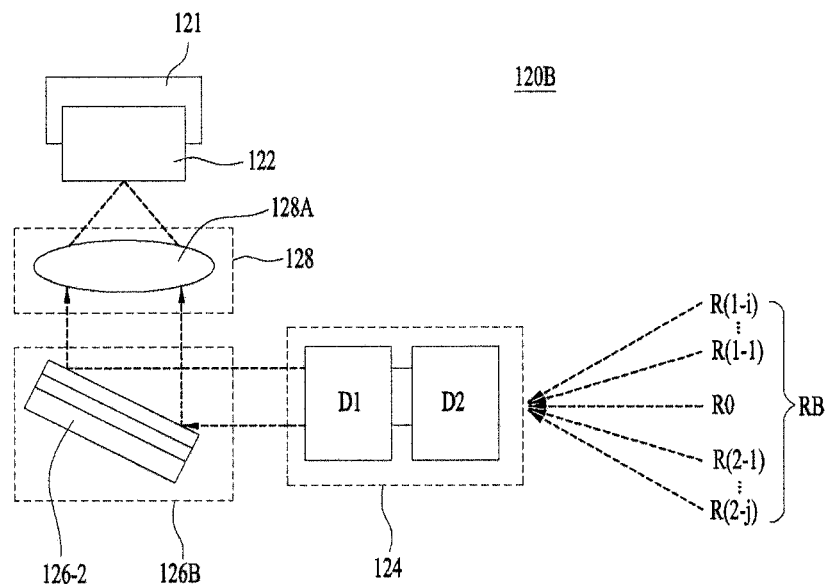
[FIG. 4]
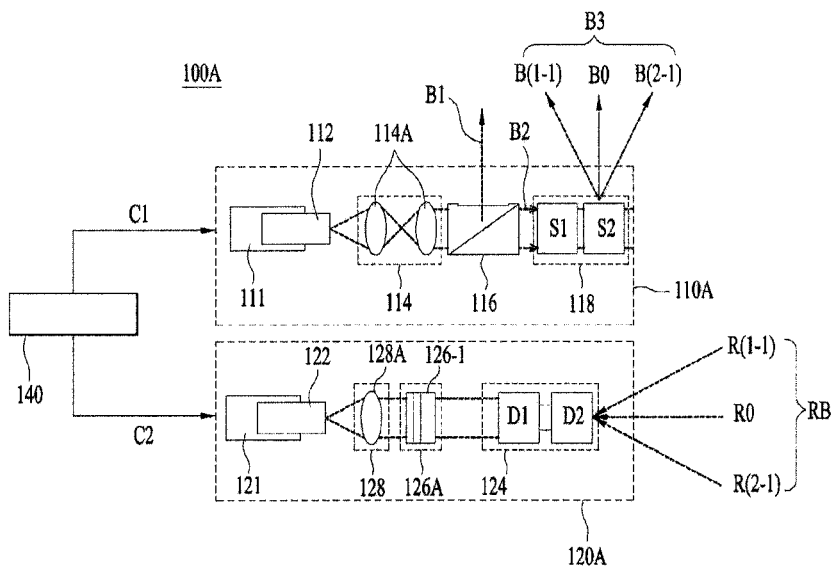

【FIG. 5】
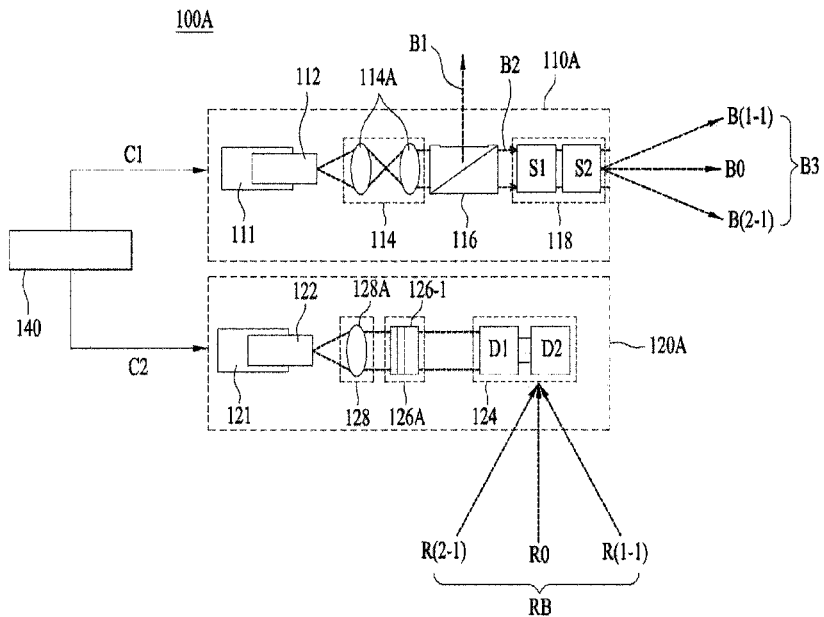
【FIG. 6】
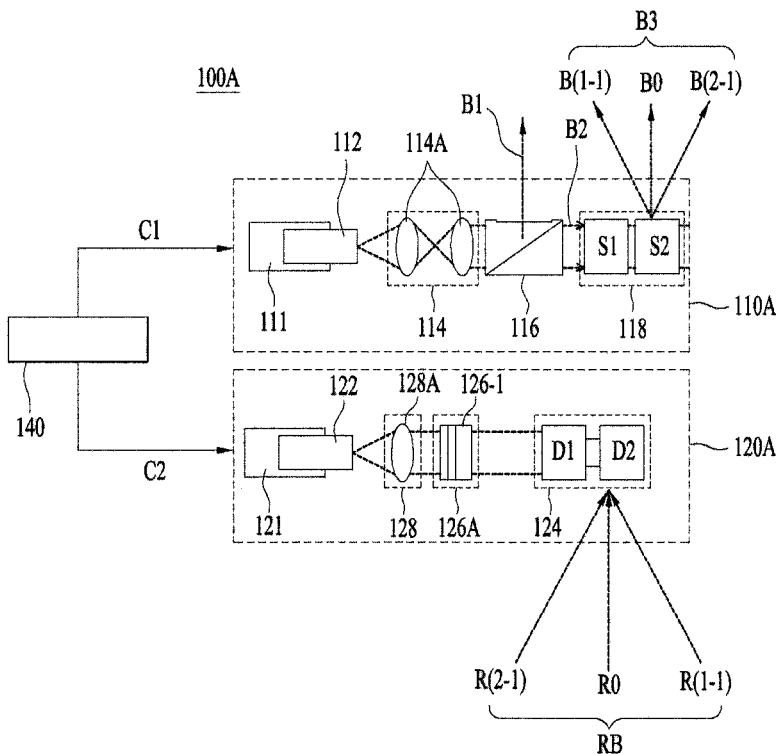

[FIG. 7]
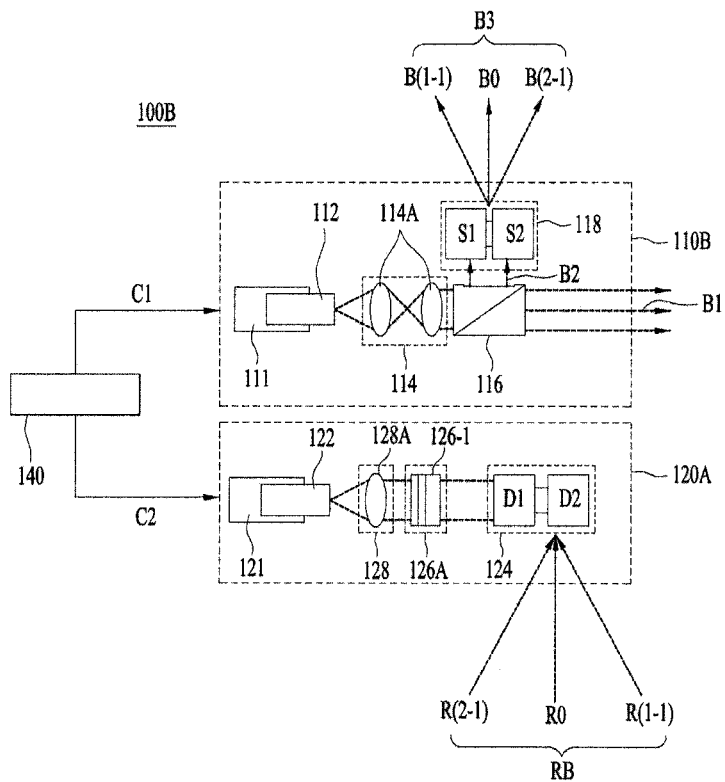
[FIG. 8]
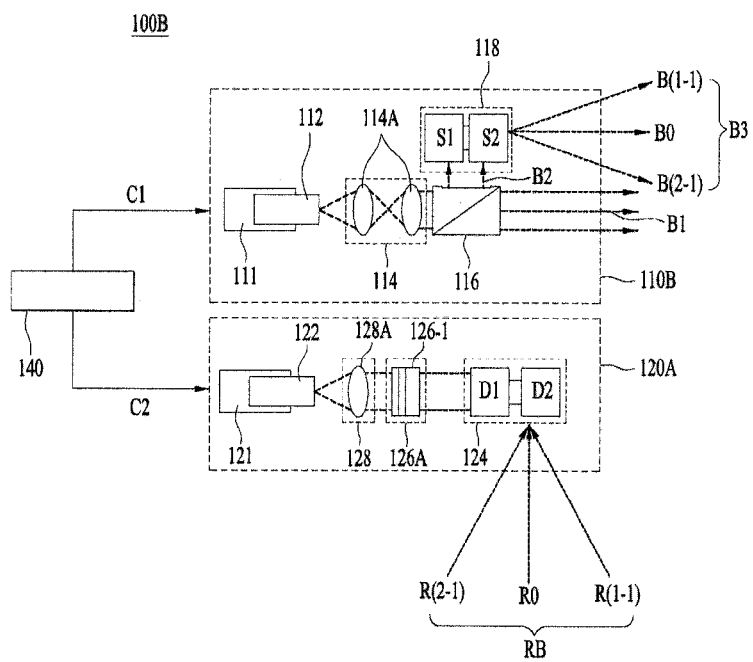

[FIG. 9]
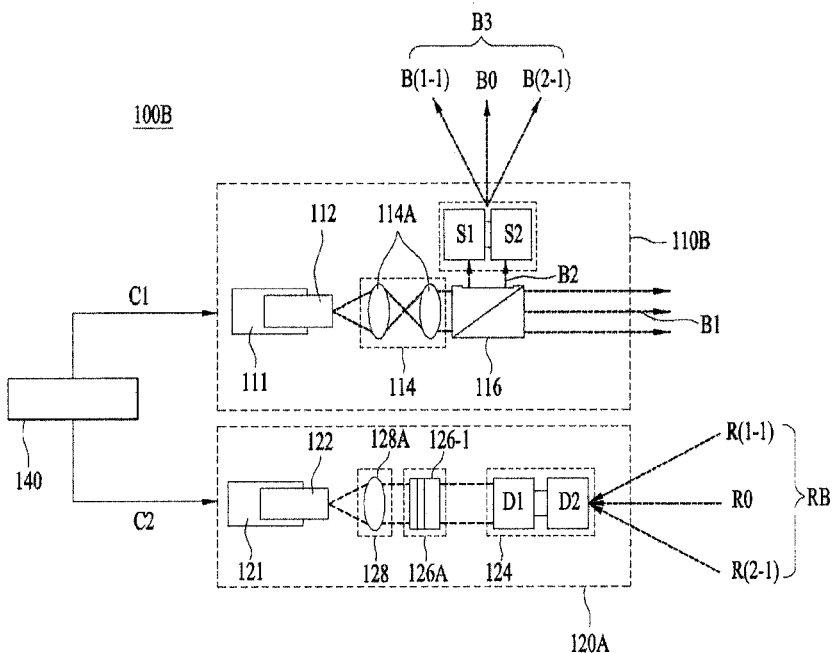
[FIG. 10]
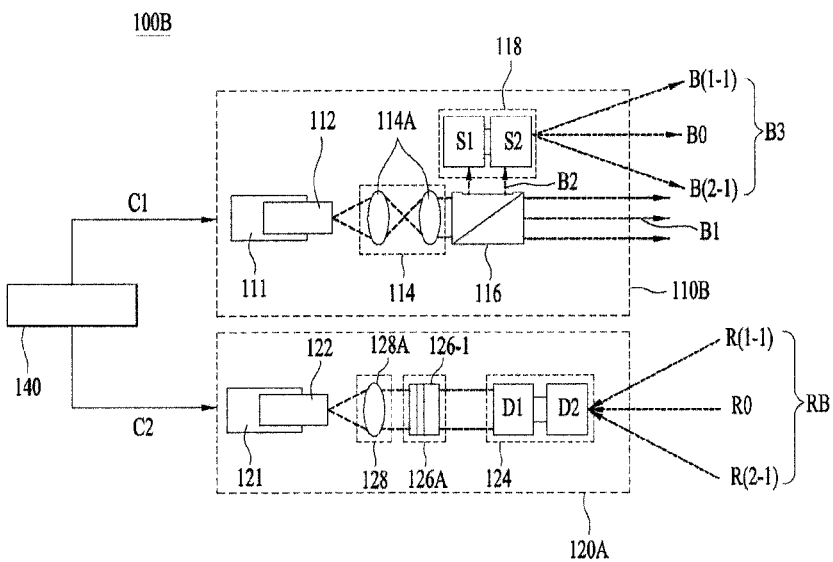

LIGHT DETECTION AND RANGING APPARATUS

CROSS REFERENCE TO RELATED APPLICATIONS

This application is the National Phase of PCT/KR2016/008326 filed on Jul. 29, 2016, which claims priority under 35 U.S.C. § 119(a) to Patent Application No. 10-2015-0107742 filed in Republic of Korea on Jul. 30, 2015, all of which are hereby expressly incorporated by reference into the present application.

TECHNICAL FIELD

Embodiments relate to a light detection and ranging apparatus.

BACKGROUND ART

A Light Detection and Ranging (LiDAR) apparatus is an apparatus that transmits a beam toward an object and receives backward-propagating light which is reflected from the object to measure, check and analyze information such as the distance to and position of the object.

FIG. 1 is a view showing an appearance 10 of a typical light detection and ranging apparatus.

As shown in FIG. 1, a typical light detection and ranging apparatus 10 emits beams emitted from a plurality of light sources (not shown) toward objects in several directions using a motor (not shown), and receives the backward-propagating light using a detector.

Since the part for sending out the plurality of beams is mechanically moved by the motor in the direction indicated by an arrow 20, various restrictions may be involved. That is, it is not easy to secure mechanical reliability of the motor, and there is a limitation in reducing the size of the light detection and ranging apparatus 10 as the motor is used. In addition, extending the measurement range in the vertical direction requires a plurality of light sources and detectors. Further, the typical light detection and ranging apparatus may have low efficiency as it requires a light collecting lens in a light receiving unit thereof, and may acquire only distance information about objects and have a limitation in acquiring various kinds of information.

DISCLOSURE

Technical Problem

Embodiments provide a light detection and ranging apparatus capable of measuring information about an object using a beam without assistance from a motor.

Technical Solution

In one embodiment, a light detection and ranging apparatus may include a light transmitting unit configured to emit a plurality of beams in different directions, and a light receiving unit configured to receive, at different angles, a plurality of backward-propagating lights returning after the emitted beams hit an object and are reflected from the object and to measure information about the object using the plurality of backward-propagating lights, wherein the light transmitting unit may include at least one light source configured to emit light, a beam splitter configured to split light emitted from the at least one light source into a first beam and a second beam, and a beam steering unit configured to divide the second beam split by the beam splitter into a plurality of third beams and to emit the divided third beams in different directions, wherein the plurality of beams emitted from the light transmitting unit may include the first beam and the plurality of third beams.

For example, in the light detection and ranging apparatus, the light transmitting unit may further includes a transmitting optical system disposed between the at least one light source and the beam splitter.

For example, the light transmitting unit may further include a first heat sink configured to discharge heat generated from the at least one light source. The at least one light source may emit the light having a central wavelength between 0.2 µm and 2 µm.

For example, the beam steering unit may include at least one transmitting optical device configured to divide the second beam split by the beam splitter into the plurality of third beams and emit the divided third beams in different directions, in response to at least one of an electrical signal, a physical signal or a chemical signal.

For example, the at least one transmitting optical device may include an optical phase array for transmission configured to generate the plurality of third beams emitted in different directions from the second beam without rotating.

For example, the light receiving unit may include a light detector configured to receive the plurality of backward-propagating lights at different angles and output the backward-propagating lights at a predetermined angle, and a light checker configured to measure information about the object from the backward-propagating lights output from the light detector.

For example, the light receiving unit may further include a receiving optical system disposed between the light detector and the light checker.

For example, the light receiving unit further may include a filter disposed between the light detector and the receiving optical system to filter a light having at least one necessary wavelength band or remove noise from the backward-propagating lights output from the light detector to allow the filtered or noise-removed backward-propagating lights to be transmitted or reflected to the light checker. A ratio of an intensity of a light having wavelength blocked by the filter to an intensity of a light having a selected wavelength may be F:1, wherein F corresponds to the intensity of the light having wavelength blocked by the filter and may be less than or equal to 0.5.

For example, the light detector may include an optical phase array for reception configured to receive the plurality of backward-propagating lights at different angles and to generate light at a predetermined angle without rotating.

For example, the light checker may check the information about the object using at least one of a difference in time between the plurality of beams and the backward-propagating lights, an intensity of the backward-propagating lights, or a spatial position of the object.

For example, the light receiving unit may further include a second heat sink configured to discharge heat generated from the light checker to an outside.

For example, the light detection and ranging apparatus may further include a driving controller configured to control an operation of at least one of the light transmitting unit or the light receiving unit. The light detection and ranging apparatus may further include a sensing unit configured to sense the first beam split by the beam splitter and to transmit a result of the sensing to the driving controller, wherein the driving controller may control an operation of at least one of the light transmitting unit or the light receiving unit using the result of the sensing. The sensing unit may include a photodiode configured to sense the split first beam and convert the sensed first beam into an electrical signal, and a sensing optical system disposed between the split first beam and the photodiode.

For example, the beam steering unit may be disposed in a direction parallel to a direction in which the light source and the beam splitter are arranged. The beam steering unit may be disposed in a direction perpendicular to a direction in which the light source and the beam splitter are arranged. An intensity ratio of the first beam to the second beam may be K:1, wherein K corresponds to the first beam and may be greater than 0 and less than 10.

For example the beam splitter may use at least one of linear polarization, circular polarization, a spatial mode of the light source, or a wavelength of the light source.

Advantageous Effects

According to embodiments, a light detection and ranging apparatus does not require a motor as it is capable of extending the range for acquiring information about an object and transmitting beams in various directions without rotating. Therefore, overall problems raised by employing a motor, including low mechanical reliability, a complicated structure and increase in manufacturing and maintenance costs may be solved. Further, the light detection and ranging apparatus may accurately measure data by improving transmission or reflection efficiency of a filter, thereby enhancing measurement accuracy. Further, with the light detection and ranging apparatus, the signal-to-noise ratio may be improved, and the number of light sources may be reduced compared to conventional cases. In addition, light receiving optical devices used in a light detection unit may be arranged so as to perform two-dimensional scanning, thereby accomplishing the effect of a conventionally used detector and simplifying signal processing. Therefore, information about objects may be quickly checked.

DESCRIPTION OF DRAWINGS

FIG. 1 is a view showing an appearance of a typical light detection and ranging apparatus.

FIG. 2 is a block diagram of a light detection and ranging apparatus according to an embodiment.

FIG. 3 is a block diagram of another example of a light receiving unit in a light detection and ranging apparatus according to an embodiment.

FIG. 4 illustrates an embodiment in which a plurality of beams is emitted and a plurality of backward-propagating lights is received by the light detection and ranging apparatus shown in FIG. 2.

FIG. 5 illustrates another embodiment in which a plurality of beams is emitted and a plurality of backward-propagating lights is received by the light detection and ranging apparatus shown in FIG. 2.

FIG. 6 illustrates another embodiment in which a plurality of beams is emitted and a plurality of backward-propagating lights is received by the light detection and ranging apparatus shown in FIG. 2.

FIG. 7 is block diagram schematically illustrating a light detection and ranging apparatus according to another embodiment.

FIG. 8 illustrates an embodiment in which a plurality of beams is emitted and a plurality of backward-propagating lights is received by the light detection and ranging apparatus shown in FIG. 7.

FIG. 9 illustrates another embodiment in which a plurality of beams is emitted and a plurality of backward-propagating lights is received by the light detection and ranging apparatus shown in FIG. 7.

FIG. 10 illustrates another embodiment in which a plurality of beams is emitted and a plurality of backward-propagating lights is received by the light detection and ranging apparatus shown in FIG. 7.

BEST MODE

Hereinafter, embodiments of the present disclosure will be described in detail with reference to the accompanying drawings in order to facilitate understanding of the present disclosure. However, the embodiments according to the present disclosure can be modified in various other forms, and the scope of the present disclosure should not be construed as being limited to the embodiments described below. The embodiments of the present disclosure are provided to enable those skilled in the art to more fully understand the present disclosure.

It is also to be understood that relational terms, such as "first" and "second," on/upper portion/above and under/lower portion/below, are used only to distinguish between one subject or element and another subject or element without necessarily requiring or involving any physical or logical relationship or sequence between such subjects or elements.

FIG. 2 is a block diagram of a light detection and ranging (LiDAR) apparatus 100A according to an embodiment.

The LiDAR apparatus 100A shown in FIG. 2 may include a light transmitting unit 110A, a light receiving unit 120A, a sensing unit 130, and a driving controller 140.

First, the light transmitting unit 110A serves to emit a plurality of beams. The light transmitting unit 110A may include a first heat sink 111, at least one light source 112, a transmission optical system 114, a beam splitter 116, and a beam steering unit 118.

The at least one light source 112 serves to emit light. If the central wavelength of light emitted from the at least one light source 112 is greater than 2 μm, the light may not be suitable for LiDAR because it is far-infrared light. If the wavelength of light emitted from the at least one light source 112 is less than 0.2 μm, the beam emitted from the light transmitting unit 110A may not only be harmful to the human body, but also may hardly reach an object (or, a body or matter) positioned at a far distance since the beam is absorbed by foreign substances in the air while proceeding toward the object. Thus, the central wavelength of the light emitted from the at least one light source 112 may be between 0.2 μm and 2 μm, but embodiments are not limited thereto.

Here, the object may be an airborne object, a ground object, or a particle floating in the air. Embodiments are not limited to the kind and position of a specific object.

Further, the wavelength distribution of the at least one light source 112 may be 1 μm or less.

The at least one light source 112 may be a light source device that emits light in the form of a pulse having a constant duty rate. Further, the on-time of the pulse may be 1 nm or more. In terms of shape, the pulse may be a square wave, a triangle wave, a sawtooth wave, a sine wave, a delta function, or a sine function. In addition, the period of the pulse may not be constant.

In addition, the at least one light source 112 may be a light source device that emits light having one or more spatial modes. Here, the spatial modes may be represented by an n-th order Gaussian or Lambertian spatial mode, where n may be greater than or equal to 1.

In addition, the at least one light source 112 may be a light source device that emits light that may be represented by the sum of linearly polarized light or circularly polarized light. The ratio of the polarization components may be expressed as 1:A on the basis of one polarization component, where A may be less than or equal to 1.

Although only one light source 112 is shown in FIG. 2, embodiments are not limited thereto. According to another embodiment, a plurality of light sources 112 may be provided. In addition, when the at least one light source 112 includes a plurality of light sources, the plurality of light sources may be of the same type or different types.

Meanwhile, heat generated by the at least one light source 112 may adversely affect the operation of the LiDAR apparatus 100A. Accordingly, the first heat sink 111 may dissipate the heat generated from the at least one light source 112 to the outside. In some cases, the first heat sink 111 may be omitted. The first heat sink 111 may dissipate the heat of the light source 112 to the outside using various methods, and embodiments are not limited to a specific type of connection between the first heat sink 111 and the light source 112 or a specific type of dissipation of heat from the first heat sink 111 to the outside.

Meanwhile, the beam splitter 114 serves to divide light emitted from the at least one light source 112 into a first beam B1 and a second beam B2. The first beam B1 divided by the beam splitting section 114 is emitted outward to an object while the second beam B2 is emitted to the beam steering section 118.

Also, the intensity ratio between the first beam B1 and the second beam B2 of the light split by the beam splitter 114 may be K:1. For example, K corresponds to the first beam B1 and may be greater than 0 and less than 10.

In addition, the beam splitter 114 may also include a device that splits light using at least one of linear polarization, circular polarization, a spatial mode of the light source 112, or a wavelength of the light source 112.

Further, the beam splitter 114 may include at least one of a device for spatially dividing the light or a device for temporally dividing the light.

The transmission optical system 114 may be disposed between the at least one light source 112 and the beam splitter 116. The transmission optical system 114 may include a collimator 114A configured to collimate the light emitted from the at least one light source 112. In some cases, the transmission optical system 114 may be omitted.

The beam steering unit 118 may divide the second beam B2 split by the beam splitter 116 into a plurality of third beams B3 (B0, B(1-1), . . . , B(1-N), B(2-M)) and emit the divided beams in different directions. Here, N may be a positive integer greater than or equal to 1, and M may be a positive integer greater than or equal to 1. The third beam B3 will be described later in detail.

According to an embodiment, the beam steering unit 118 may include at least one transmitting optical device. In the case of FIG. 2, the beam steering unit 118 is illustrated as including first and second transmitting optical devices S1 and S2, but embodiments are not limited thereto. That is, the beam steering unit 118 may include only one transmitting optical device, or may include three or more transmitting optical devices. Hereinafter, the beam steering unit 118 will be described as including the first and second transmitting optical devices S1 and S2, but embodiments are not limited thereto.

The first and second transmitting optical devices S1 and S2 may divide the second beam B2 coming from the beam splitter 116 into a plurality of third beams B3 and emit the divided beams in different directions.

The plurality of beams emitted from the light transmitting unit 110A toward the object may include a first beam B1 and a third beam B3. Each of the first and second transmitting optical devices S1 and S2 may emit a plurality of beams B1 and B3 toward the object in different directions even without being mechanically rotated by a motor or the like.

Each of the first and second transmitting optical devices S1 and S2 may divide the second beam B2 into a plurality of third beams B3 in different directions in response to at least one of an electrical signal, a physical signal, or a chemical signal, and emit the divided beams. The electrical signal, physical signal, or chemical signal may be provided from the driving controller 140 to the light transmitting unit 110A in the form of a first control signal C1. In other words, when there is an external stimulus, at least one of an electrical signal, a physical signal or a chemical signal may be generated as the first control signal C1 by the driving controller 140 according to the stimulus, and the travel directions (i.e., emission angles) of the plurality of third beams B3 emitted from each of the first and second transmitting optical devices S1 and S2 may be determined by the first control signal C1.

In addition, each of the first and second transmitting optical devices S1 and S2 may be implemented with an optical phase array (OPA) for transmission. The OPA for transmission may generate a plurality of third beams B3 to be emitted in different directions from the second beam B2 divided by the beam splitter 116.

Each of the first and second transmitting optical devices S1 and S2, which may be implemented with an OPA for transmission, may be implemented in various ways as follows.

First, each of the first and second transmitting optical devices S1 and S2 may have a surface on which a diffraction grating is periodically formed. When at least one of the period, the angle, or the shape of the grating is changed, the first and second transmitting optical devices S1 and S2 may generate a plurality of third beams B3 to be emitted in different directions.

Further, each of the first and second transmitting optical devices S1 and S2 may have an internal structure in which a difference in refractive index is periodically changed. In this case, when the period is changed or the refractive index is changed, the first and second transmitting optical devices S1 and S2 may generate a plurality of third beams B3 to be emitted in different directions.

Further, each of the first and second transmitting optical devices S1 and S2 may have a grating structure for polarization that periodically turns on/off polarization using liquid crystals. In this case, when at least one of the spacing or the transmittance of the gratings is adjusted, the first and second transmitting optical devices S1 and S2 may generate a plurality of third beams B3 to be emitted in different directions.

In addition, each of the first and second transmitting optical devices S1 and S2 may have a shape of a birefringent prism. In this case, when the angle of the prism is changed, the first and second transmitting optical devices S1 and S2 may generate a plurality of third beams B3 to be emitted in different directions.

In addition, each of the first and second transmitting optical devices S1 and S2 may have a structure having a boundary surface between air and a liquid such as oil. In this case, when an external signal is applied to change the boundary surface or to change the refractive index of the liquid, the first and second transmitting optical devices S1 and S2 may generate a plurality of third beams B3 to be emitted in different directions.

In addition, when the refractive index or the density distribution pattern inside the medium is changed using a hologram technique, the first and second transmitting optical devices S1 and S2 may generate a plurality of third beams B3 to be emitted in different directions.

In addition, each of the first and second transmitting optical devices S1 and S2 may have a structure in which the transmittance is periodically changed according to the intensity of the liquid crystal. In this case, when the period is changed or the transmittance is changed, the first and second transmitting optical devices S1 and S2 may generate a plurality of third beams B3 to be emitted in different directions.

In addition, each of the first and second transmitting optical devices S1 and S2 may have a MEMS (Micro-Electro-Mechanical System) mirror array. In this case, when the operation state of each pixel is controlled, the first and second transmitting optical devices S1 and S2 may generate a plurality of third beams B3 to be emitted in different directions.

Further, when an ultrasonic wave is projected into the medium and the frequency of the ultrasonic wave is changed, the first and second transmitting optical devices S1 and S2 may generate a plurality of third beams B3 to be emitted in different directions.

Further, each of the first and second optical transmission devices S1 and S2 may have a medium having an electric field formed on the upper side, lower side, left side, and right side. In this case, when the intensity or frequency of the electric field is changed, the first and second transmitting optical devices S1 and S2 may generate a plurality of third beams B3 to be emitted in different directions.

Further, each of the first and second transmitting optical devices S1, S2 may have a set of two or more aligned lenses. In this case, when the individual lenses of the lens set are moved up, down, leftward, or rightward, the first and second transmitting optical devices S1 and S2 may generate a plurality of third beams B3 to be emitted in different directions.

Further, each of the first and second transmitting optical devices S1 and S2 may have a set of two or more aligned microlens arrays (MLAs). In this case, when the individual MLAs are moved up, down, leftward, or rightward, the first and second transmitting optical devices S1 and S2 may generate a plurality of third beams B3 to be emitted in different directions.

In addition, each of the first and second transmitting optical devices S1 and S2 may have a set of two or more aligned MLAs. In this case, when the period or shape of the individual MLAs is changed, the first and second transmitting optical devices S1 and S2 may generate a plurality of third beams B3 to be emitted in different directions.

The range of width to change the period (or a pattern such as a surface) described above may be 0.1 µm to 2 mm such that the various transmitting optical devices described above may emit light in different directions. The range to vary the refractive index described above may be above 1 and below 2.7 when the wavelength is 1000 nm. The range to vary the transmittance and reflectance described above may be above 0 and below 1. However, embodiments are not limited thereto.

In addition, the various transmitting optical devices described above may be complexly combined to generate a plurality of third beams B3 to be emitted in different directions.

Further, in order to operate each of the first and second transmitting optical devices S1 and S2 having various structures as described above, an electrical signal may be applied to both ends of each of the first and second transmitting optical devices S1 and S2. In this case, the electrical signal may be a periodic voltage signal or current signal. For example, the operating rate of the electrical signal may be less than or equal to 10 GHz.

In addition, in order to operate each of the first and second transmitting optical devices S1 and S2 having various structures as described above, either physical pressure may be applied to the first and second transmitting optical devices S1 and S2, or the physical positions of the first and second transmitting optical devices S1 and S2 may be changed. In this case, the physical positions of the first and second transmitting optical devices S1 and S2 may be moved along the optical axis or in two axial directions perpendicular to the optical axis. To this end, a magnetic field, a piezoelectric (PZT) element, a voice coil motor (VCM), a link structure, or gravity and elasticity may be used.

The plurality of third beams B3 generated and emitted from the first and second transmitting optical devices S1 and S2 implementing the beam steering unit 118 may include at least one of a '0'-th beam B0 emitted along the optical axis, N beams from a '1-1'-st beam to '1-N'-th beam (B(1-1), ..., B(1-N)), which are emitted with being spaced apart from each other counterclockwise with respect to the optical axis, or M beams from a '2-1'-st beam to '2-M'-th beam (B(2-1), ..., B(2-M)), which are emitted with being spaced apart from each other clockwise with respect to the optical axis.

In addition, the plurality of third beams B0, B(1-1), ..., B(1-N), B(2-M) may be spaced apart from each other and emitted. Each of the '1-1'-st to '1-N'-th beams B(1-1) to B(1-N) and the '2-1'-st to '2-M'-th beams B(2-1) to B(2-M) may be spaced from the '0'-th beam B0 by a predetermined angle to be emitted. For example, the '1-1'-st beam B(1-1) may be spaced apart from the '0'-th beam BO by a '1-1'-st angle $\theta(1-1)T$, and the '1-N'-th beam B(1-N) may be spaced apart from the 0'-th beam BO by a '1-N'-th angle $\theta(1-N)T$. The '2-1'-st beam B(2-1) may be spaced apart from the '0'-th beam BO by a '2-1'-st angle $\theta(2-1)T$, and the '2-M'-th beam B(2-M) may be spaced apart from the '0'-th beam BO by a '2-M'-th angle $\theta(2-M)T$.

The angle by which the '1-N'-th beam B(1-N) or the '2-M'-th beam B(2-M) is spaced apart from the '0'-th beam BO may be the largest angle among the angles by which the plurality of third beams B3 is spaced apart from each other. The largest spacing angle $\theta(1-N)T$ or $\theta(2-M)T$ may be less than 90°, but embodiments are not limited thereto.

In addition, the spacing angle between neighboring beams among the '0'-th, '1-1'-st to '1-N'-th and '2-1'-st to '2-M'-th beams BO, B(1-1) to B(1-N), and B(2-1) to B(2-M) may be less than 20°, but embodiments are not limited thereto.

Meanwhile, the light receiving unit 120A may receive, at different angles, a plurality of backward-propagating lights corresponding to the lights returning after a plurality of beams B1 and B3 emitted from the light transmitting unit 110A hit an object (not shown) and are reflected from the object, and may measure (or check or analyze) the information about the object using the received plurality of backward-propagating lights.

According to an embodiment, the light receiving unit 120A may include a second heat sink 121, a light checker 122, a light detector 124, a filter 126A, and a receiving optical system 128.

The optical detector 124 receives, at different angles, a plurality of backward-propagating lights RB returning after hitting the object and then being reflected from the object, and sends the received backward-propagating lights to the light checker 122 at a predetermined angle.

The backward-propagating light RB received by the optical detector 124 may include at least one of a '0'-th backward-propagating light RO received along the optical axis, i backward-propagating lights from a '1-1'-st backward-propagating light to a '1-i'-th backward-propagating light (R(1-1), . . . , R(1-i)), which are received with being spaced apart from each other counterclockwise with respect to the optical axis, or j backward-propagating lights from a '2-1'-st backward-propagating light to '2-j'-th backward-propagating light (R(2-1), . . . , R(2-j)), which are received with being spaced apart from each other clockwise with respect to the optical axis. Here, i may be a positive integer greater than or equal to 1, and j may be a positive integer greater than or equal to 1.

In addition, each of the '1-1'-st to '1-i'-th backward-propagating lights R(1-1) to R(1-i) and the '2-1'-st to '2-j'-th backward-propagating lights R(2-1) to R(2-j) may be spaced from the '0'-th backward-propagating light BO by a predetermined angle to be incident. For example, the '1-1'-st backward-propagating light R(1-1) may be spaced apart from the '0'-th backward-propagating light RO by a '1-1'-st angle θ(1-1)R, and the '1-i'-th backward-propagating light R(1-i) may be spaced apart from the 0'-th backward-propagating light RO by a '1-i'-th angle θ(1-i)R. The '2-1'-st backward-propagating light R(2-1) may be spaced apart from the '0'-th backward-propagating light RO by a '2-1'-st angle θ(2-1)R, and the '2-j'-th backward-propagating light R(2-j) may be spaced apart from the '0'-th backward-propagating light RO by a '2-j'-th angle θ(2-j)R. In this way, a plurality of backward-propagating lights R0, R(1-1), . . . , R(1-i), and R(2-1), . . . , R(2-j) may be spaced apart from each other and be incident on the light detector 124.

Further, the light detector 124 may include at least one receiving optical device. While the light detector 124 is illustrated in FIG. 2 as including first and second receiving optical devices D1 and D2, embodiments are not limited thereto. That is, according to another embodiment, the light detector 124 may include only one receiving optical device, or may include three or more receiving optical devices. As with the transmitting optical devices S1 and S2, the receiving optical devices D1 and D2 may operate in response to at least one of an electrical signal, a physical signal or a chemical signal. The electrical signal, physical signal, or chemical signal may be provided from the driving controller 140 to the light receiving unit 120A in the form of a second control signal C2. In other words, when there is an external stimulus, at least one of an electrical signal, a physical signal or a chemical signal may be generated as the second control signal C2 from the driving controller 140 by the stimulation, and each of the first and second receiving optical devices D1 and D2 may adjust at least one of transmission or reflection efficiency for each angle according to the generated second control signal C2.

Further, each of the first and second receiving optical devices D1 and D2 may be implemented with an optical phase array (OPA) for reception. The OPA for reception may receive a plurality of backward-propagating lights at different angles and output the same at a predetermined angle. Each of the first and second receiving optical devices D1 and D2, which may be implemented with an OPA for reception, may operate in various ways as follows.

First, each of the first and second receiving optical devices D1 and D2 may have a surface on which a diffraction grating is periodically formed. When at least one of the period, the angle, or the shape of the grating is changed, each of the first and second receiving optical devices D1 and D2 may operate.

Further, each of the first and second receiving optical devices D1 and D2 may have a structure in which a difference in refractive index is periodically changed. In this case, when the period is changed or the refractive index is changed, each of the first and second receiving optical devices D1 and D2 may operate.

Further, each of the first and second receiving optical devices D1 and D2 may have a shape of a birefringent prism. In this case, when the angle of the prism is changed, each of the first and second receiving optical devices D1 and D2 may operate.

In addition, each of the first and second receiving optical devices D1 and D2 may have a structure having a boundary surface between air and a liquid such as oil. In this case, when an external signal is applied to change the boundary surface or to change the refractive index of the liquid, each of the first and second receiving optical devices D1 and D2 may operate.

In addition, when the refractive index or the density distribution pattern inside the medium is changed using a hologram technique, each of the first and second receiving optical devices D1 and D2 may operate.

Further, each of the first and second receiving optical devices D1 and D2 may have a set of two or more aligned lenses. In this case, when the individual lenses of the lens set are moved up, down, leftward, or rightward, each of the first and second receiving optical devices D1 and D2 may operate.

Further, each of the first and second receiving optical devices D1 and D2 may have a set of two or more aligned microlens arrays (MLAs). In this case, when the individual MLAs are moved up, down, left, or right, each of the first and second receiving optical devices D1 and D2 may operate.

In addition, each of the first and second receiving optical devices D1 and D2 may have a set of two or more aligned MLAs. In this case, when at least one of the period or shape of the individual MLAs is changed, each of the first and second receiving optical devices D1 and D2 may operate.

The range of width to change the period (or a pattern such as a surface) described above may be 0.1 μm to 2 mm such that the various receiving optical devices described above can operate. The range to vary the refractive index described above may be above 1 and below 2.7 when the wavelength is 1000 nm. The range to vary the transmittance and reflectance may be above 0 and below 1. However, embodiments are not limited thereto.

In addition, the light detector 124 may combinedly include a plurality of receiving optical devices that operate in various manners as described above.

In order to operate the first and second receiving optical devices D1 and D2 having various structures as described above, an electrical signal may be applied to both ends of each of the first and second receiving optical devices D1 and D2. In this case, the electrical signal may be a periodic voltage signal or current signal. For example, the operating rate of the electrical signal may be less than or equal to 10 GHz.

Further, in order to operate the first and second receiving optical devices D1 and D2 having various structures as described above, either physical pressure may be applied to the first and second receiving optical devices D1 and D2, or the physical positions of the first and second receiving optical devices D1 and D2 may be changed. In this case, the physical positions of the first and second receiving optical devices D1 and D2 may be moved along the optical axis or in two axial directions perpendicular to the optical axis. To this end, a magnetic field, a PZT element, a VCM, a link structure, or gravity and elasticity may be used.

The angle at which the backward-propagating light is incident may be adjusted in various ways. For example, the '1-i' or '2-j backward-propagating light R(1-i) or R(2-j) is spaced at the largest angle from the '0'-th beam BO. The largest spacing angle θ(1-i)R or θ(2-j)R may be set to be smaller than 90°, but embodiments are not limited thereto.

In addition, the spacing angle between neighboring beams among the '0'-th, '1-1'-st to '1-i'-th and '2-1'-st to '2-j'-th beams RO, R(1-1) to R(1-i), and R(2-1) to R(2-j) may be less than 20°, but embodiments are not limited thereto.

In addition, the receiving optical system 128 may be disposed between the light checker 122 and the light detector 124 to focus light emitted from the light detector 124 and provide the focused light to the light checker 122. To this end, the receiving optical system 128 may include a collector 128A, but embodiments are not limited thereto. In some cases, the receiving optical system 128 may be omitted.

FIG. 3 is a block diagram of another example 120B of a light receiving unit in the LiDAR apparatus 100A according to an embodiment.

The light receiving unit 120B shown in FIG. 3 may include a second heat sink 121, a light checker 122, a light detector 124, a filter 126B, and a receiving optical system 128. Aside from the fact that the filter 126B is different from the filter 126A shown in FIG. 2 in terms of form, the light receiving unit 120B shown in FIG. 3 is the same as the light receiving unit 120A shown in FIG. 2.

The filters 126A and 126B, may be disposed between the light detector 124 and the receiving optical system 128, may selectively filter light having at least one necessary wavelength among the backward-propagating lights emitted from the light detector 124 or remove noise, and provide the result to the light checker 122 through transmission or reflection. The transmissive filter 126A as shown in FIG. 2 may perform filtering by selectively transmitting light having a desired wavelength, while the reflective filter 126A as shown in FIG. 3 may perform filtering by selectively reflecting light having a desired wavelength.

In some cases, the filters 126A and 126B may be omitted.

The transmission or reflection efficiency of the filters 126A and 126B may be improved because the OPA for reception outputs, at a constant angle, the backward-propagating lights incident at different angles.

Further, a plurality of wavelengths may be filtered by the filters 126A and 126B.

Further, the range of the central wavelength of at least one wavelength of light filtered by the filters 126A and 126B may be between 0.2 μm and 2 μm, and the bandwidth of the wavelength of the filtered light may be greater than or equal to 1 nm. Further, when the ratio of the intensity 'F' of the wavelength of light blocked by the filters 126A and 126B to the intensity of the wavelength of the selected light is F:1, F corresponds to the intensity of the light having wavelength blocked by the filter 126A or 126B and may be less than or equal to 0.5.

In addition, the filter 126A may include a filter optical device that has at least one central angle of incident light at which the transmission efficiency of the filter 126A is maximized. In addition, the filter 126B may include a filter optical device that has at least one central angle of the incident light at which the reflection efficiency of the filter 126B is maximized. Here, the filter optical devices may be implemented in various forms.

For example, the filter optical devices 126-1 and 126-2 may be realized by stacking two or more thin films having two or more refractive indexes. Alternatively, a filter type optical device may be implemented by forming a grating structure on the surface to adjust the refraction or reflection angle of a specific wavelength. Alternatively, the filter optical devices may be implemented to select a specific wavelength by periodically changing the internal refractive index.

The light having the wavelength band selected by the filters 126A and 126B is transmitted or reflected and sent to the light checker 122. If the filter 126A is a transmissive filter that allows light to be transmitted to the light checker 122 therethrough, the transmission efficiency of the filter 126A may be maximized when the incident angle of the light incident on the transmissive filter 126A is 60° or less. Alternatively, if the filter 126B is a reflective filter that reflects light and transmits the light to the light checker 122, the reflection efficiency of the filter 126B may be maximized when the angle of the light incident on the reflective filter 126B is 25° or more.

The second heat sink 121 may serve to emit heat generated from the light checker 122 to the outside, and may be omitted in some cases.

The light checker 122 may measure (or analyze) the information about the object from the backward-propagating lights provided from the light detector 124 via the filters 126A and 126B.

The light checker 122 may measure the difference in time between the plurality of beams emitted from the light transmitting unit 110A and the backward-propagating lights output from the light detector 124. To this end, the light checker 122 may convert the intensities of the backward-propagating lights, which correspond to the lights returning after the plurality of beams B1 and B3 emitted from the light transmitting unit 110A hits an object and then is reflected from the object, into an electrical signal. Alternatively, the light checker 122 may convert the intensities of the lights, which return after the plurality of beams B1 and B3 emitted from the light transmitting unit 110A hits the object and then is reflected from the object, into electrical signals in a time sequence. Then, the light checker 122 may measure a difference in time between the plurality of beams and the backward-propagating lights using the electrical signals.

In addition, the light checker 122 may measure the time difference based on a time at which a part of the beams emitted from the light transmitting unit 110A is earlier measured. Also, the light checker 122 may also measure the time difference based on an electrical signal synchronized with the light transmitting unit 110A.

In addition, the light checker 122 may be implemented by arranging one or more light receiving units in a one-dimensional or two-dimensional array. In this case, the time difference of light reflected at a certain position may be measured using the plurality of light receiving units. Alternatively, the spatial difference between the signals and the time difference between the respective spaces may be measured through the plurality of light receiving units. The received light signal may be distinguished for each pixel of the array and converted into an electrical signal. For example, an avalanche photodiode (APD), a single photon avalanche photodiode (SPAPD), a single avalanche photodiode (SAPD), a photodiode (PD), a quantum well photodiode (QWP), or a photo multiplying tube (PMT) may be used as the light receiving unit.

In addition, the light checker 122 may simultaneously measure the time difference between the light transmitted from the light transmitting unit 110A and the backward-propagating light, which returns after hitting the object and then being reflected from the object, and the spatial positions.

In addition, the light checker 122 may analyze the information about the object using at least one of the intensity of the backward-propagating light or the spatial position of the object. Here, the information about the object to be checked may include at least one of distance information or position information about the object, for example.

In addition, the light checker 122 may measure basic data for measuring the information about the object and transmit the measurement result to an analysis unit (not shown). In this case, the analysis unit may analyze the information about the object using the basic data measured by the light checker 122.

The LiDAR apparatus 100A according to the embodiment described above may further include a first housing H1. The first housing H1 may have a shape that surrounds the light transmitting unit 110A and the light receiving portion 120A. The first housing H1 may be omitted.

Meanwhile, the driving controller 140 may serve to control at least one of the light transmitting unit 110A or the light receiving unit 120A. That is, the driving controller 140 may generate an electrical signal, a physical signal, or a chemical signal in the form of the first and second control signals C1 and C2, and control the drivings of the transmitting optical devices S1 and S2 and the receiving optical devices D1 and D2 using the first and second control signals C1 and C2.

Here, each of the first and second control signals C1 and C2 generated by the driving controller 140 may take the form of a continuous wave (CW) or a continued pulse, but embodiments are not limited to a specific form of the first and second control signals C1 and C2.

Meanwhile, the sensing unit 130 senses the first beam B1 split by the beam splitter 116 and transmits the sensing result to the driving controller 140. In this case, the driving controller 140 may generate the first and second control signals C1 and C2 using the sensing result received from the sensing unit 130, and use the generated first and second control signals C1 and C2 to control each of the light transmitting unit 110A and the light receiving unit 120A.

In order to perform the above-described operation, the sensing unit 130 may include a photodiode 132 and a sensing optical system 134. The photodiode 132 may sense the first beam B1 split by the beam splitter 116, convert the sensed first beam B1 into an electrical signal, and output the converted electrical signal to the driving controller 140 as a sensing result.

The sensing optical system 134 is disposed between the split first beam B1 and the photodiode 132. To this end, the sensing optics 134 may include, for example, a plurality of prisms 134-1 and 134-2, but embodiments are not limited thereto.

As described above, by controlling the light transmitting unit 110A and the light receiving unit 120A using the first beam B1 split by the beam splitter 116, precision of the value finally checked by the light checker 122 may be improved. For example, if it is determined that the intensity of the first beam B1 is low in the analysis of the result of sensing by the sensing unit 130, the intensity of the second beam B2 may be estimated to be low. Accordingly, in order to increase the intensity of the second beam B2, the driving controller 140 may increase the intensity of light emitted from the light source 112 as desired. Accordingly, the issue of inaccurate analysis of the information about the object resulting from low intensities of a plurality of backward-propagating lights received by the light receiving units 120A and 120B due to low intensities of the plurality of beams B1 and B3 may be addressed.

The LiDAR apparatus 100A according to the above-described embodiment may further include a second housing H2. The second housing (H2) may have a shape that surrounds the sensing unit 130. The second housing H2 may be omitted.

According to an embodiment, the plurality of beams emitted to the object includes the first beam B1 as well as the third beam B3. Therefore, the directions of the beams emitted to the object may be extended compared to the conventional cases. Extension of the directions of the beams will be described with reference to the accompanying drawings.

FIGS. 4 to 6 show various views according to an embodiment in which the LiDAR apparatus 100A shown in FIG. 2 emits a plurality of beams B1 and B3 and receives a plurality of backward-propagating lights RB. For simplicity, while it is illustrated in FIGS. 4 to 6 that the number of beams emitted to an object and the number of backward-propagating lights are both 3, embodiments are not limited thereto.

Referring to FIG. 2, the first beam B1 is emitted in a second direction perpendicular to the direction of the optical axis (hereinafter referred to as "first direction"), along which the light source 112, the transmitting optical system 114, and the beam splitter 116 are arranged. Also, the third beam B3 is emitted in the first direction, and is also emitted in a direction within a range of ±90° with respect to the optical axis. The light detector 124 receives the '0'-th backward-propagating light RO incident in the first direction, which is the optical axis direction, and receives backward-propagating lights R(1-1) and R(2-1) in an area belonging to the angular range within ±90° with respect to the optical axis.

In addition, referring to FIG. 4, the first beam B1 is emitted in the second direction perpendicular to the optical axis direction, and the angle at which the light detector 124 receives the backward-propagating light is formed as shown in FIG. 2. In the case of FIG. 4, the third beam B3 is emitted in the second direction, and also in a direction within the range of ±90° with respect to the second direction, in contrast with FIG. 2.

Also, referring to FIG. 5, the directions in which the first beam B1 and the third beam B2 are emitted are formed as shown in FIG. 2

In contrast with FIG. 2, the light detector 124 not only receives a backward-propagating light RO along an axis parallel to the second direction and perpendicular to the optical axis, but also receives backward-propagating lights R(1-1) and R(2-1) in an area belonging to an angular range within ±90° with respect to the perpendicular axis.

Also, referring to FIG. 6, the directions in which the first beam B1 and the third beam B3 are emitted are as shown in FIG. 4, and the directions in which the backward-propagating light are incident are as shown in FIG. 5.

FIG. 7 is block diagram schematically illustrating a LiDAR apparatus 100B according to another embodiment.

In the LiDAR apparatus according to the embodiment illustrated in FIGS. 2 to 6, the beam steering unit 124 is disposed in a direction parallel to the first direction, which is the direction of the optical axis along which the light source 112, the transmitting optical system 11, and the beam splitter 116 are arranged.

On the other hand, in the LiDAR apparatus 100B shown in FIG. 7, the beam steering unit 118 is arranged in a second direction perpendicular to the first direction. Except for this configuration, the LiDAR apparatus 100B shown in FIG. 7 is the same as the LiDAR apparatus 100A shown in FIG. 2, and thus the same reference numerals are used, and redundant description of the same parts will be omitted.

FIGS. 8 to 10 show various views according to an embodiment in which the LiDAR apparatus 100B shown in FIG. 7 emits a plurality of beams B1 and B3 and receives a plurality of backward-propagating lights RB.

Referring to FIG. 7, the direction in which the third beam B3 is emitted and the direction in which the backward-propagating lights RB are incident are the same as shown in FIG. 6. However, unlike the case shown in FIG. 6, the first beam B1 is emitted in the first direction, which is the direction of the optical axis.

Referring to FIG. 8, the direction in which the third beam B3 is emitted and the direction in which the backward-propagating lights RB are incident are the same as shown in FIG. 5. However, unlike the case shown in FIG. 5, the first beam B1 is emitted in the first direction which is the direction of the optical axis.

Referring to FIG. 9, the directions in which the first beam B1 and the third beam B3 are emitted are the same as shown in FIG. 7. However, unlike the case shown in FIG. 7, the directions in which a plurality of backward-propagating lights RB is incident are the same as shown in FIG. 2.

Referring to FIG. 10, the directions in which the first beam B1 and the third beam B3 are emitted are the same as shown in FIG. 8. However, unlike the case shown in FIG. 8, the directions in which a plurality of backward-propagating lights RB is incident are the same as shown in FIG. 9.

As described above, in the case of the LiDAR apparatuses 100A and 100B according to the embodiments, the first and third beams B1 and B3 may be emitted in various directions and the plurality of backward-propagating lights RB may be incident in various directions.

Particularly, in the case of the embodiments shown in FIGS. 2 to 10, not only the plurality of third beams B3, but also the first beam B1 is emitted toward the object. Therefore, compared to the case where the beam splitter 116 is not provided, a larger number of beams may be emitted toward the object, and therefore the range in which the information about the object is acquired may be extended.

As described above, since the beam steering unit 118 of the LiDAR apparatus according to an embodiment includes a phase array for transmission capable of transmitting beams in various directions without rotating, the necessity to use a motor is eliminated. Therefore, overall problems raised by employing a motor, including low mechanical reliability, a complicated structure and increase in manufacturing and maintenance cost may be solved. That is, in contrast with the conventional LiDAR apparatus, the LiDAR apparatus according to an embodiment may be miniaturized to the beam size level of at least one light source 112, the mechanical reliability may be increased, and the structure may be simplified. Therefore, manufacturing and maintenance costs may be reduced.

In addition, since the LiDAR apparatus according to an embodiment has a light receiving unit which receives light using at least one receiving optical device D1, D2, the transmittance or reflectance efficiency of the filters 126A and 126B may improve in comparison with the conventional LiDAR apparatus, thereby correctly and accurately measuring data. Thus, measurement accuracy may be enhanced. Further, as noise is removed by the filters 126A and 126B, the signal to noise ratio (SNR) may be improved.

Further, since the transmitting optical devices S1 and S2 included in the beam steering unit 118 are arranged so as to enable two-dimensional scanning such that a plurality of beams may be two-dimensionally emitted toward an object in various directions, the number of the light sources 112 may be reduced compared to the conventional cases. In addition, as the receiving optical devices D1 and D2 used by the light detector 124 are disposed to enable two-dimensional scanning, the same effect as obtained with the conventional detector may be obtained.

Compared to the conventional LiDAR apparatus that uses a light source and a detector, the LiDAR apparatus according to an embodiment employs transmitting optical devices S1 and S2 and receiving optical devices D1 and D2 to simplify signal processing, and therefore may quickly check the information about an object.

While the present disclosure has been particularly shown and described with reference to exemplary embodiments thereof, it is to be understood that the disclosure is not limited to the disclosed embodiments. It will be understood by those skilled in the art that various modifications and applications are possible without departing from the essential features of the embodiments. For example, each component specifically shown in the embodiments may be modified and implemented. It is to be understood that all changes and modifications that come within the meaning and equivalency range of the claims are therefore intended to be embraced therein.

Mode for Invention

The mode for carrying out the disclosure has been fully described in "Best Mode".

INDUSTRIAL APPLICABILITY

The apparatus for light detection and ranging may be used in movable objects, for example, vehicles.

The invention claimed is:
1. A light detection and ranging apparatus, comprising:
a light transmitting unit configured to emit a plurality of beams in different directions; and
a light receiving unit configured to receive, at different angles, a plurality of backward-propagating lights returning after the emitted beams hit an object and are reflected from the object, and to measure information about the object using the plurality of backward-propagating lights,
wherein the light transmitting unit comprises:
at least one light source configured to emit a light;
a beam splitter configured to split the light emitted from the at least one light source into a first beam and a second beam; and a beam steering unit configured to divide the second beam split by the beam splitter into a plurality of third beams and to emit the divided third beams in the different directions,
wherein the beam steering unit includes at least one transmitting optical device configured to divide the second beam into the plurality of third beams, and emit the third beams in the directions different from each other, in response to at least one of an electrical signal, a physical signal or a chemical signal, and
wherein the plurality of beams emitted from the light transmitting unit includes the first beam and the plurality of third beams.

2. The light detection and ranging apparatus according to claim 1, wherein the light transmitting unit further comprises a transmitting optical system disposed between the at least one light source and the beam splitter.

3. The light detection and ranging apparatus according to claim 1, wherein the at least one light source emits the light having a central wavelength between 0.2 µm and 2 µm.

4. A light detection and ranging apparatus, comprising:
a light transmitting unit configured to emit a plurality of beams in different directions; and
a light receiving unit configured to receive, at different angles, a plurality of backward-propagating lights returning after the emitted beams hit an object and are reflected from the object, and to measure information about the object using the plurality of backward-propagating lights,
wherein the light transmitting unit comprises:
at least one light source configured to emit a light;
a beam splitter configured to split the light emitted from the at least one light source into a first beam and a second beam; and
a beam steering unit configured to divide the second beam split by the beam splitter into a plurality of third beams and to emit the divided third beams in the different directions,
wherein the plurality of beams emitted from the light transmitting unit include the first beam and the plurality of third beams, and
wherein the light receiving unit comprises:
a light detector configured to receive the plurality of backward-propagating lights at different angles and output the received backward-propagating lights at a predetermined angle; and
a light checker configured to measure the information about the object from the backward-propagating lights output from the light detector.

5. The light detection and ranging apparatus according to claim 4, wherein the light receiving unit further comprises a receiving optical system disposed between the light detector and the light checker.

6. The light detection and ranging apparatus according to claim 5, wherein the light receiving unit further comprises a filter disposed between the light detector and the receiving optical system to filter a light having at least one necessary wavelength band or remove a noise from the backward-propagating lights output from the light detector to allow the filtered or noise-removed backward-propagating lights to be transmitted or reflected to the light checker.

7. The light detection and ranging apparatus according to claim 4, wherein the light detector includes an optical phase array configured to receive the plurality of backward-propagating lights at the different angles and to generate the lights at the predetermined angle without rotating.

8. The light detection and ranging apparatus according to claim 4, wherein the light checker checks the information about the object using at least one of a difference in time between the plurality of beams and the backward-propagating lights, an intensity of the backward-propagating lights or a spatial position of the object.

9. The light detection and ranging apparatus according to claim 1, further comprising a driving controller configured to control an operation of at least one of the light transmitting unit or the light receiving unit.

10. A light detection and ranging apparatus, comprising:
a light transmitting unit configured to emit a plurality of beams in different directions;
a light receiving unit configured to receive, at different angles, a plurality of backward-propagating lights returning after the emitted beams hit an object and are reflected from the object, and to measure information about the object using the plurality of backward-propagating lights,
wherein the light transmitting unit comprises:
at least one light source configured to emit a light;
a beam splitter configured to split the light emitted from the at least one light source into a first beam and a second beam; and
a beam steering unit configured to divide the second beam split by the beam splitter into a plurality of third beams and to emit the divided third beams in the different directions,
wherein the plurality of beams emitted from the light transmitting unit include the first beam and the plurality of third beams;
a driving controller configured to control an operation of at least one of the light transmitting unit or the light receiving unit; and
a sensing unit configured to sense the first beam split by the beam splitter and to transmit a result of a sensing to the driving controller,
wherein the driving controller controls the operation of at least one of the light transmitting unit or the light receiving unit using the result of the sensing.

11. The light detection and ranging apparatus according to claim 10, wherein the sensing unit comprises:
a photodiode configured to sense the split first beam and convert a sensed first beam into an electrical signal; and
a sensing optical system disposed between the split first beam and the photodiode.

12. The light detection and ranging apparatus according to claim 1, wherein the beam steering unit is disposed in a direction parallel to a direction in which the light source and the beam splitter are arranged.

13. The light detection and ranging apparatus according to claim 1, wherein the beam steering unit is disposed in a direction perpendicular to a direction in which the light source and the beam splitter are arranged.

14. The light detection and ranging apparatus according to claim 1, wherein an intensity ratio of the first beam to the second beam is K:1, wherein K corresponds to the first beam and is greater than 0 and less than 10.

15. The light detection and ranging apparatus according to claim 1, wherein the light transmitting unit further comprises a first heat sink configured to discharge heat generated from the at least one light source.

16. The light detection and ranging apparatus according to claim 1, wherein the at least one transmitting optical device includes an optical phase array configured to generate the plurality of third beams emitted in the different directions from the second beam without rotating.

17. The light detection and ranging apparatus according to claim 4, wherein the light receiving unit further comprises a second heat sink configured to discharge heat generated from the light checker to an outside.

18. The light detection and ranging apparatus according to claim 6, wherein a ratio of an intensity of a wavelength blocked by the filter to an intensity of a selected wavelength is F:1, wherein F corresponds to an intensity of a light having the wavelength blocked by the filter and is less than or equal to 0.5.

19. The light detection and ranging apparatus according to claim 1, wherein the beam splitter uses at least one of a linear polarization, a circular polarization, a spatial mode of the light source, or a wavelength of the light source.

20. The light detection and ranging apparatus according to claim 4, wherein the light detector includes at least one receiving optical device configured to receive the plurality of backward-propagating lights at the different angles and output the lights at the predetermined angle in response to at least one of an electrical signal, a physical signal or a chemical signal.

21. The light detection and ranging apparatus according to claim 1, wherein the information about the object includes at least one of a distance to or a position of the object.

22. The light detection and ranging apparatus according to claim 4, wherein the information about the object includes at least one of a distance to or a position of the object.

23. The light detection and ranging apparatus according to claim 10, wherein the information about the object includes at least one of a distance to or a position of the object.

24. The light detection and ranging apparatus according to claim 11, wherein the sensing optical system includes a plurality of prisms.

* * * * *